(12) United States Patent
Toppari et al.

(10) Patent No.: US 8,731,727 B2
(45) Date of Patent: May 20, 2014

(54) METHOD FOR CONTROLLING A DIGITAL HYDRAULIC CONTROLLER

(75) Inventors: Juhani Toppari, Nuppulinna (FI); Ville Hopponen, Mäntsälä (FI)

(73) Assignee: Valmet Technologies, Inc., Espoo (FI)

( * ) Notice: Subject to any disclaimer, the term of this patent is extended or adjusted under 35 U.S.C. 154(b) by 408 days.

(21) Appl. No.: 13/322,854

(22) PCT Filed: May 29, 2009

(86) PCT No.: PCT/EP2009/056637
§ 371 (c)(1),
(2), (4) Date: Nov. 28, 2011

(87) PCT Pub. No.: WO2010/136071
PCT Pub. Date: Dec. 2, 2010

(65) Prior Publication Data
US 2012/0083928 A1   Apr. 5, 2012

(51) Int. Cl.
*G05D 16/00* (2006.01)
*G05D 16/20* (2006.01)
*F15B 19/00* (2006.01)

(52) U.S. Cl.
CPC ............ *G05D 16/00* (2013.01); *G05D 16/2013* (2013.01); *F15B 19/00* (2013.01)
USPC ...................................................... 700/282

(58) Field of Classification Search
CPC ..... G05D 16/00; G05D 16/2013; F15B 19/00
USPC ........................................................ 700/282
See application file for complete search history.

(56) References Cited

U.S. PATENT DOCUMENTS

| 2,952,363 | A | * | 9/1960 | Griswold ........................ 210/193 |
| 4,119,016 | A | * | 10/1978 | Pfeil et al. ........................ 91/449 |
| 4,170,245 | A |  | 10/1979 | Haley |

(Continued)

FOREIGN PATENT DOCUMENTS

| DE | 19724447 A1 | 12/1998 |
| WO | 2010/136071 A1 | 12/2010 |

OTHER PUBLICATIONS

"Webtec: Hydraulic Test Equipment Product Overview", www.webtec.com, Jan. 2014.*

(Continued)

*Primary Examiner* — Michael D Masinick
(74) *Attorney, Agent, or Firm* — Stiennon & Stiennon

(57) ABSTRACT

A digital hydraulic controller has a feed line, a drain line, an output line and a plurality of individually switchable on/off valves which selectively connect the feed line to the output line or which connect the output line to the drain line. A controlled quantity is detected which includes a pressure and/or a flow rate of a fluid in the output line. One of the valves is selected to be switched to control the amount and direction of fluid passing through the valve for controlling the controlled quantity to approach a target value. A test sequence is performed including calibration of the individual valves by alternately opening two of the valves, one of which connects the feed line to the output line and the other connects the output line to the drain line, and by calculating and setting calibration values for the individual valves.

18 Claims, 1 Drawing Sheet

(56) References Cited

U.S. PATENT DOCUMENTS

| | | | |
|---|---|---|---|
| 4,191,215 A | | 3/1980 | Gonner |
| 4,842,017 A | | 6/1989 | Reynolds |
| 5,832,948 A | * | 11/1998 | Schell .............................. 137/93 |
| 6,019,116 A | * | 2/2000 | Schell .............................. 137/14 |
| 2012/0083928 A1 | * | 4/2012 | Toppari et al. ................. 700/282 |
| 2012/0304637 A1 | * | 12/2012 | Allen et al. ..................... 60/501 |
| 2013/0098461 A1 | * | 4/2013 | Toppari et al. ..................... 137/2 |

OTHER PUBLICATIONS

"Modelling of Flow Characteristics of On/Off Valves", Linjama et al, Department of Intelligent Hydraulics and Automation, Tampere University of Technology, Finland. Oct. 24-25, 2012.*

International Search Report for PCT/EP2009/056637.

Written Opinion of the International Searching Authority for PCT/EP2009/056637.

* cited by examiner

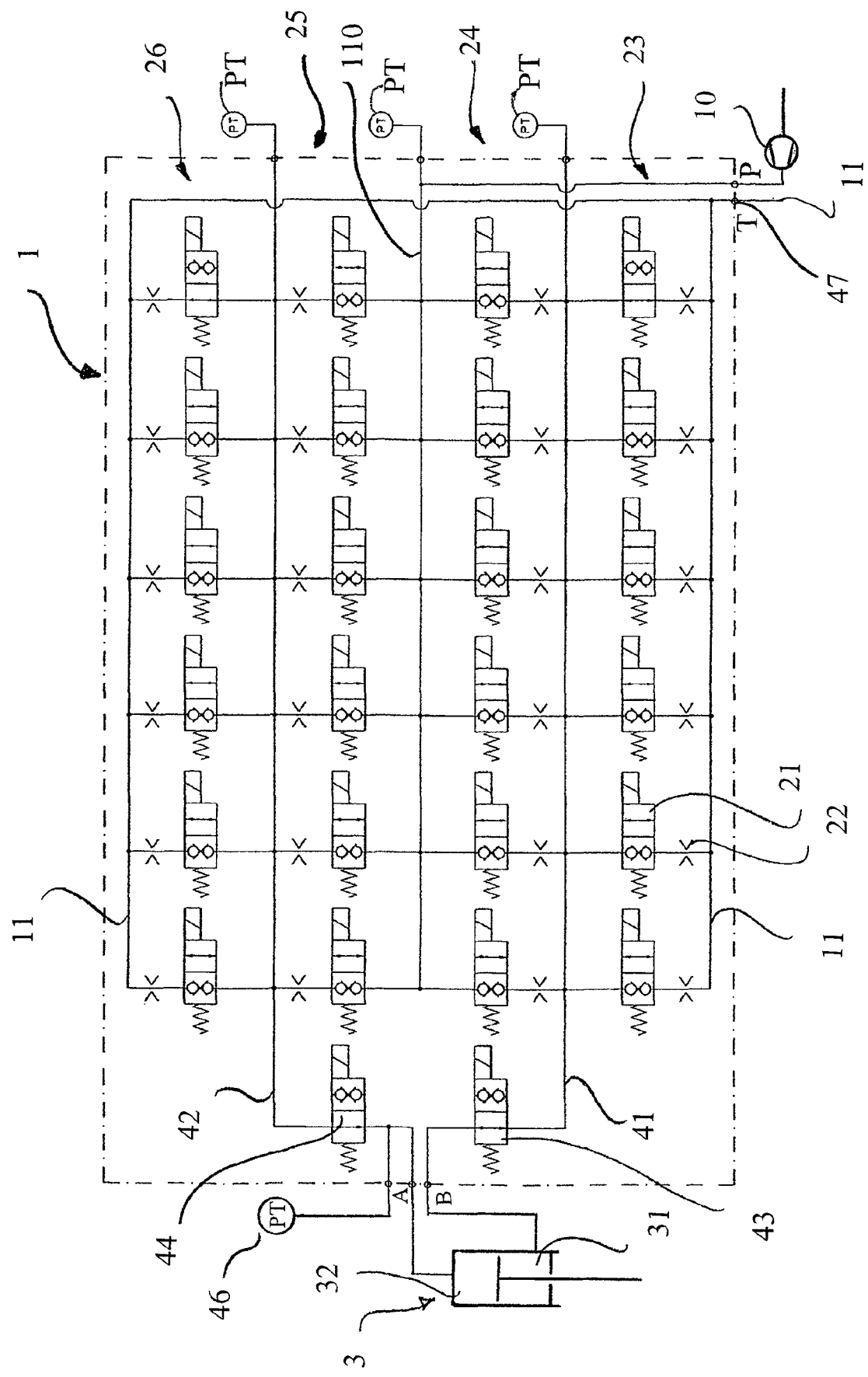

METHOD FOR CONTROLLING A DIGITAL HYDRAULIC CONTROLLER

CROSS REFERENCES TO RELATED APPLICATIONS

This application claims priority on International App. No. PCT/EP2009/056637, filed May 29, 2009, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method for controlling a digital hydraulic controller. Such a controller comprises a set of on/off-valves which are connected in parallel to extend between an input line and an output line of a controller. Usually, each of these valves is connected to one of these lines with a throttle or choke arranged between the line and the valve. In the digital hydraulics technology, the throttle values within one set of valves are set such that the individual flows through the respective valve-line connections form a binary row, e.g. when the smallest flow through the smallest throttle is 1, then the further valve-line connections exhibit a flow rate of 2, 4, 8, 16 etc. Typically, for pressure control, the controller has two sets of valves in which one set of valves connects an input or feed line to an output line of the controller, while the other set of valves connects the output line to a drain line.

By suitably switching suitable combinations of the individual on/off-valves in the controller, flow of fluid through the controller from input line to output line is controlled for controlling either fluid flow or fluid pressure at the output line of that controller. In this way the controller digitalizes the analog behavior of a control edge of a spool valve, so as to replace the latter.

Selection of the suitable valve combinations and the individual opening times and other parameters of operation of the digital hydraulic controller, requires calibration values for each valve and its throttle. When applied to hydraulic cylinder, for example, it has been known to run the cylinder from end to end while observing the linear sensor for the cylinder movement and pressure sensors for the pressures in the individual pressure chambers of the cylinder. From these measurement data, calibration values for the flow or throughput for each valve and its throttle is calculated manually.

However, when the controller is used in practical applications, changes of the temperatures of the working fluid, foreign matter in the working fluid and/or fouling in the valve or throttle may significantly affect the precision of the calibration values spontaneously or gradually. In such cases, the controller becomes inaccurate. Also, improper valve function due to e.g. defects in the solenoid drive may occur which also affect control accuracy.

SUMMARY OF THE INVENTION

In view of the above, it is the object of the invention to provide a method for controlling a digital hydraulic controller which improves the accuracy of the control in operation.

According to the invention there is provided a method for controlling a digital hydraulic controller having a feed line, a drain line, an output line and a plurality of individually switchable on/off valves which selectively connect the feed line to the output line or which connect the output line to the drain line. The method comprises the steps of detecting a controlled quantity including a pressure and/or a flow rate of a fluid in the output line, selecting at least one of the plurality of the valves which is to be switched to control the amount and direction of fluid passing through the selected at least one valve for controlling said controlled quantity to approach a target value, and performing a test sequence. The test sequence includes a calibration of the individual valves by alternately opening two of the valves, one of which connects the feed line to the output line and the other one of which connects the output line to the drain line, and by calculating and setting calibration values for the individual valves according to detected flow and pressure values in the controller, and/or a condition monitoring in which each of the valves is sequentially switched, and in which a valve opening condition of the individual valve is concluded from the detected flow and pressure values in response to the valve switching.

By way of the method described above, it is possible to check or to improve the calibration of the controller on the basis of measured values obtained in practical application of the controller. In particular, since the values which are measured may be immediately used for setting the calibration, it is possible to react on changes in the controller or in the ambient conditions.

Further, by way of the method described above, it is possible to identify valve malfunction of an individual valve by its effect on the controlled quantity. Therefore, no additional function monitoring equipment like additional wiring or piping is required for the system check which ensures the proper function of the controller. Furthermore, the result of the condition monitoring in case of valve malfunction (e.g. a valve does not open) may be used to select another combination of valves to be operated to maintain the controlling function of the controller. In this way at least an emergency operation until the next machine operation stop can be ensured.

In a preferred solution, in the calibration, in a controller configuration in which the plurality of valves are arranged in multiple pairs, wherein each pair comprises one valve for connecting the feed line to the output line, and one valve for connecting the output line to the drain line, the valves of the same pair can be alternately opened for calibration. Advantageously allocating the calibration data to the individual valves can become easier when in the calibration two valves are alternately opened which have the same design flow characteristics.

In an advantageous solution, the calibration may include a sequential calibration of individual sets of valves containing two valves, wherein the calibration is performed for all valves of the controller.

In a preferred solution, the condition monitoring may include deciding whether a valve has a fault, and may include changing of the selection of the at least one valve, which changed selection then excludes the faulty valve from the valves to be switched for the control.

Advantageously, the test sequence may be performed in regular time intervals based on operation time of the controller or the test sequence may be performed in regular time intervals based on an integrated value of the flow through the controller.

In order to cope with changes in temperature of the working fluid, the test sequence may be performed when the temperature change of the fluid exceeds a predetermined temperature change value.

Additionally or alternatively, the test sequence may be performed when the pressure and/or flow response at the controller output line differs from the anticipated response corresponding to switching the selected valves by more than a predetermined amount of pressure and/or flow.

In a preferred solution, the controller may be provided with a switchable on/off output valve for interrupting the output line between the controller and an actuator controlled by the controller, and wherein the test sequence is performed, while the output valve is closed. In this case an independent controller test can be made without affecting the controlled process. In particular, since the test sequence may be carried out quickly, the period in which the connection between the controller and the controlled actuator is interrupted is short, effect on the actuator, although test sequences are run, is negligible.

Alternatively, the test sequence may performed during operation of the controller with the output being connected to an actuator, wherein the test sequence is interrupted and pressure and/or flow control is resumed when the pressure and/or flow value differs from the target value by more than a predetermined amount.

In an advantageous form of the method, the selection step may comprise the selection of a combination of valves to be switched simultaneously for a set time period, wherein the selection of the combination and the setting of the opening time period is calculated from a mathematical model.

In an alternative solution, the selection step may comprise the selection of a combination of valves to be switched for set time periods different for each valve, wherein the selection of the combination and the setting of the different opening time periods is calculated from a mathematical model.

Preferably a plurality of feed valves may be connected in parallel to the feed line and the output line, and a plurality of drain valves may be connected in parallel to the output line and the drain line wherein the selection then includes selecting of a number of feed valves for increasing the pressure at the controller output or selecting a number of drain valves for decreasing the pressure at the controller output. In an advantageous form of this, the individual feed valves may each have a different flow characteristic to pass different flow rates of fluid when open, and wherein the individual drain valves may each have a different flow characteristic to release different flow rates of fluid to the drain line when open. It is further preferred if for each feed valve there is a drain valve having the same design flow characteristic.

BRIEF DESCRIPTION OF THE DRAWINGS

In FIG. 1 there is shown a schematic drawing of a digital hydraulic controller.

DESCRIPTION OF THE PREFERRED EMBODIMENTS

In FIG. 1 a digital hydraulic controller 1 consists of four rows or sets of on/off switching valves 23, 24, 25, 26 one of which valves is indicated with reference sign 21. Each valve 21 is provided with a throttle, one of which is indicated with reference sign 22.

A pump 10 provides working fluid to a pressure feed line 110 to which the valve rows 24 and 25 are connected. There is further a drain line 11 to which the valves of the valve rows 23 and 26 are connected.

A hydraulic cylinder 3 has two pressure chambers 31 and 32. The valve rows 23 and 24 are connected to an output line 41 to pressure chamber 31 of the cylinder 3. A valve 43 is provided in line 41 to interrupt the connection between the cylinder 3 and the valves in rows 23 and 24.

The valve rows 25 and 26 are connected to an output line 42 to pressure chamber 32 of the cylinder 3. A valve 44 is provided in line 42 to interrupt the connection between the cylinder 3 and the valves in rows 25 and 26.

Sensors indicated with PT are adapted to measure pressure and temperature in the respective lines 110, 41, 42, and a flow sensor 47 is provided in the tank line 11. A pressure sensing position 46 is shown for the pressure in output line 42, a similar pressure sensor may be provided for output line 41.

In the test sequence and for calibration, valves are switched according to a predetermined pattern (usually pairs of valves in rows 23 and 24 together and in rows 25 and 26 together). From the measured values for the flow at 47 and/or the pressure measurements at the respective sensors PT the actual flow through each valve and its related throttle can be determined so as to set an actual calibration value for each valve. In order to maintain the cylinder 3 unaffected by that test sequence, the corresponding switch-off valve 43 for calibrating valves in rows 23 and 24 is switched to the off position to interrupt line 41. Analogously switch-off valve 44 is switched off for calibrating valves in rows 25 and 26 to interrupt output line 42. However, the calibration may also be done with the cylinder being still connected to the controller by using pressure change readings at sensor 46 in response to valve actuation.

Alternatively, pressure measurement at sensor position 46 may be used when calibrating the valves in rows 25 and 26. Of course the same arrangement may be used for rows 23, 24.

Finally, in the test sequence with respect to monitoring the valve function, it is preferred to interrupt the respective output line when the function of the valves is checked. In this test sequence, the valves of e.g. row 26 are sequentially opened and the flow is measured/detected so as to conclude whether the valve function is in order or not. In order to provide fluid supply for the function test, one valve (usually the one with the largest flow value) in the parallel row 25 is maintained open. In case the valves of row 25 are to be function-tested, one valve (usually the one with the largest flow value) in row 26 is maintained open to let the fluid out to pass flow sensor 47. The corresponding way of testing is conducted with rows 23 and 24, respectively.

Summarily, the invention may be carried out as follows: In the control circuit of digital hydraulics is added a separate test sequence which alternately opens two valves of the same size at a time inside the block. Based on the feed and line pressure measurements and the reading of a flow sensor, new calibration values are automatically calculated for the valves. In the output lines of the valve blocks, there are separate on/off valves which are closed for the time of the test sequence, whereby no flow or pressure changes occur to the direction of the actuator. After the sequence has stopped, new calibration values are updated for each valve, whereby the controller again operates ideally.

If pressure transmitters 46 are added on the process side of the on/off valves closing the output lines, the test sequence can also be performed during pressure adjustment. If the measured output line pressure differs adequately from the target value, the test sequence can be interrupted and the line pressure adjusted again as desired and the sequence can be performed again. This gives the particular advantages that new calibration values can be measured and updated for the controller easily, quickly and accurately, that the test sequence can be performed without moving the cylinder, and that the test sequence can also be performed during pressure adjustment.

In addition to the above, in the control circuit of digital hydraulics is added a separate test sequence which alternately opens each single valve and checks from the response that the valve works. In the output lines of the valve blocks, there are separate on/off valves 43, 44 which are closed for the time of the test sequence, whereby no flow or pressure changes occur to the direction of the actuator. If faulty valves are detected, the control circuit removes the valves from approved opening combinations and the set of valves continues its operation almost as normal.

If pressure transmitters 46 are added on the process side of the on/off valves closing the output lines, the test sequence can be performed during pressure adjustment also during run. If the measured output line pressure differs adequately from the target value, the test sequence can be interrupted and the line pressure adjusted again as desired and the sequence can be performed again. This leads to the particular advantages that no extra valve status signals are required, that in addition to the electric faults of the valve, also mechanical faults, e.g. the blocking of the stem or the clogging of the throttle, can be detected, and that condition monitoring may take place during normal production or during a shutdown.

In a modification, in the control of digital hydraulics, an embedded control system may be used which is able to perform quickly a program written in a high level language. A function is added to the program which monitors the effect of a change made in the measurement result. From the used valve combination and a possible fault of the response, the program can deduct which valve does not operate as expected. The inoperative valve can be removed from the approved combinations and the control system can be informed.

The invention claimed is

1. A method for controlling and testing a digital hydraulic controller having a feed line, a drain line, an output line and a plurality of individually switchable on/off valves which selectively connect the feed line to the output line or which connect the output line to the drain line, said method of controlling and testing comprising controlling steps of:
    detecting a controlled quantity in said output line;
    selecting at least one of the plurality of valves and switching it to control the amount of fluid passing through the selected at least one valve for controlling said controlled quantity to approach a target value, and periodically, and to improve control of the digital hydraulic controller, performing the testing steps of:
    performing a test sequence for calibration of individual valves of the plurality of individually switchable on/off valves in the digital hydraulic controller by:
    selecting a pair of valves including one valve which selectively connects the feed line to the output line, and one valve which selectively connects the output line to the drain line;
    opening said pair of valves;
    detecting a controlled quantity of a pressure or a flow rate of a fluid in said output line;
    calculating and setting in the controller calibration values for the individual valves of the pair of valves according to the detected controlled quantity of pressure or flow rate.

2. The method of claim 1 further comprising the steps of:
    performing a condition monitoring sequence in which each individual valve of the plurality of valves is sequentially switched, and in which a valve open condition of the individual valve is concluded from the detected flow or pressure values in response to the valve switching, the condition monitoring sequence comprising:
    providing a fluid supply for the function test by maintaining one valve which connects the feed line to the output line open, and opening each valve which connects the output line to the drain line, one at a time, and detecting or measuring flow;
    providing a drain for the function test by maintaining one valve which connects the output line to the drain line open, and opening each valve which connects the feed line to the output line, one at a time, and detecting or measuring flow.

3. The method of claim 1 wherein the plurality of valves are arranged in multiple pairs, and wherein each pair comprises one valve for connecting the feed line to the output line, and one valve for connecting the output line to the drain line, and wherein in said calibration the valves of the same pair are opened together.

4. The method of claim 1 wherein said two of the valves which are opened together have the same design flow characteristics.

5. The method of claim 1 wherein said calibration includes a sequential calibration of individual sets of valves containing two valves, wherein the calibration is performed for all valves of the controller.

6. The method of claim 2 wherein the condition monitoring includes deciding whether a valve has a fault, and setting calibration values for the valve with the fault to exclude the valve with the fault from the valves to be switched for the controlling.

7. The method of claim 1 wherein the test sequence is performed at regular time intervals based on how long a time the controller has ben operating.

8. The method of claim 1 wherein the test sequence is performed in regular time intervals based on an integrated value of the flow through the controller.

9. The method of claim 1 wherein the test sequence is performed when the temperature change of the fluid exceeds a predetermined temperature change value.

10. The method of claim 1 wherein the test sequence is performed when the pressure or flow response at the controller output line differs from the anticipated response corresponding to switching selected valves by more than a predetermined amount of pressure or flow.

11. The method of claim 1 wherein the controller is provided with a switchable on/off output valve for interrupting the output line between the controller and an actuator controlled by the controller, and wherein the test sequence is performed while the output valve is closed.

12. The method of claim 1 wherein the test sequence is preformed during operation of the controller with the output line being connected to an actuator, wherein the test sequence is interrupted and pressure or flow control is resumed when a detected pressure or flow value differs from a target value by more than a predetermined amount.

13. The method of claim 1 wherein during operation of the controller with the output line being connected to an actuator, further comprising the steps of detecting a controlled quantity including a pressure or a flow rate of a fluid in said output line, and selecting a combination of valves and switching them simultaneously for a set time period, wherein the selection of the combination and the setting of the opening time period is calculated from a mathematical model.

14. The method of claim 13 wherein the selection step comprises the selection of a combination of valves which are switched for set time periods which are different for each valve, wherein the selection of the combination and the setting of the different opening time periods is calculated from a mathematical model.

15. The method of claim 1 wherein a plurality of feed valves is connected in parallel to the feed line and the output line, and a plurality of drain valves is connected in parallel to the output line and the drain line and wherein the controlling selection step includes selecting a number of feed valves for increasing the pressure at the controller output line or selecting a number of drain valves for decreasing the pressure at the controller output line.

16. The method of claim 15 wherein the valves which selectively connect the feed line to the output line comprise feed valves, and wherein the valves which selectively connect the output line to the drain line comprise drain valves, and wherein the individual valves which selectively connect the feed line to the output line each have a different flow characteristic to pass different flow rates of fluid when open, and wherein the individual valves which connect the output line to the drain line each have a different flow characteristic to release different flow rates of fluid to the drain line when open.

17. The method of claim 16 wherein for each valve which selectively connects the feed line to the output line or which connects the output line to the drain line there is a valve which connects the output line to the drain line having the same design flow characteristic.

18. A method for controlling and testing a digital hydraulic controller having a feed line, a drain line, an output line and a plurality of individually switchable on/off valves which selectively connect the feed line to the output line or which connect the output line to the drain line, said method of controlling and testing comprising controlling steps of:

detecting a controlled quantity in said output line;

selecting at least one of the plurality of the valves and switching it to control the amount of fluid passing through the selected at least one valve for controlling said controlled quantity to approach a target value, and periodically, and to improve control of the digital hydraulic controller, performing the testing steps of:

performing a test sequence in which each individual valve of the plurality of valves is sequentially switched, and in which a valve open condition of the individual valve is concluded from the detected flow or pressure values in response to the valve switching, the test sequence comprising:

providing a fluid supply for the function test by maintaining one valve which connects the feed line to the output line open, and opening each valve which connects the output line to the drain line, one at a time, and detecting or measuring flow;

providing a drain for the function test by maintaining one valve which connects the output line to the drain line open, and opening each valve which connects the feed line to the output line, one at a time, and detecting or measuring flow; and if no flow is detected in an individual valve, setting calibration values for said valve to exclude the valve from the valves to be switched for the controlling.

* * * * *